US011104256B1

United States Patent
Gonzalez et al.

(10) Patent No.: US 11,104,256 B1
(45) Date of Patent: Aug. 31, 2021

(54) ERGONOMIC HEADREST SPEAKER

(71) Applicants: Pastor C. Gonzalez, Miami, FL (US); David J. Matos, Miami Lakes, FL (US)

(72) Inventors: Pastor C. Gonzalez, Miami, FL (US); David J. Matos, Miami Lakes, FL (US)

( * ) Notice: Subject to any disclaimer, the term of this patent is extended or adjusted under 35 U.S.C. 154(b) by 0 days.

(21) Appl. No.: 16/520,032

(22) Filed: Jul. 23, 2019

Related U.S. Application Data

(60) Provisional application No. 62/711,645, filed on Jul. 30, 2018.

(51) Int. Cl.
| | | |
|---|---|---|
| A47C 7/38 | (2006.01) | |
| A47C 7/72 | (2006.01) | |
| B60N 2/879 | (2018.01) | |
| B60R 11/02 | (2006.01) | |
| H04R 5/02 | (2006.01) | |
| B60R 11/00 | (2006.01) | |

(52) U.S. Cl.
CPC ............ B60N 2/879 (2018.02); A47C 7/383 (2013.01); B60R 11/0217 (2013.01); H04R 5/023 (2013.01); *B60R 2011/0017* (2013.01)

(58) Field of Classification Search
CPC ..... A47C 7/383; B60N 2/879; B60R 11/0217; B60R 2011/0017
USPC ......... 297/397; 5/656, 904; 381/301, 77, 79, 381/311, 333, 388
See application file for complete search history.

(56) References Cited

U.S. PATENT DOCUMENTS

| | | | | |
|---|---|---|---|---|
| 4,100,633 A | * | 7/1978 | Pintos .................... | A45B 17/00 5/656 X |
| 4,440,443 A | * | 4/1984 | Nordskog ................ | A47C 7/38 297/397 |
| 4,635,110 A | * | 1/1987 | Weinblatt ............ | B60R 11/0211 206/335 |
| 4,679,263 A | * | 7/1987 | Honer .................... | A47C 7/383 5/904 X |
| 4,797,934 A | * | 1/1989 | Hufnagel ............... | A47C 7/383 297/217.4 X |
| 4,991,222 A | * | 2/1991 | Nixdorf ................. | H04R 5/023 297/397 X |
| 5,063,912 A | * | 11/1991 | Hughes ................ | A47D 15/001 5/904 X |
| 5,313,678 A | * | 5/1994 | Redewill .............. | A47C 21/003 5/904 X |
| 5,630,651 A | * | 5/1997 | Fishbane ................ | A47C 7/383 297/397 X |
| 5,707,108 A | * | 1/1998 | Pi .......................... | A47C 7/425 297/217.4 X |
| 5,799,344 A | * | 9/1998 | Najar .................... | A45D 19/08 297/397 |
| 6,010,192 A | * | 1/2000 | King ..................... | A47C 7/383 297/217.4 |

(Continued)

Primary Examiner — Rodney B White
(74) Attorney, Agent, or Firm — John Rizvi; John Rizvi, P.A.—The Patent Professor®

(57) ABSTRACT

A headrest speaker comprising a headrest body including one or more speakers and one or more ergonomic curves for supporting a user's head or neck. The ergonomic curves may be configured for providing comfortable support for the user's head or neck. The one or more speakers may be located on vertically extending wings configured to be on opposite sides of a user's head, to play audio into the user's ears. The headrest speaker may be waterproof and sand-proof.

17 Claims, 6 Drawing Sheets

(56) References Cited

U.S. PATENT DOCUMENTS

| | | | | |
|---|---|---|---|---|
| 6,044,161 A * | 3/2000 | Lee | H04R 5/023 | |
| | | | 5/904 X | |
| 6,123,389 A * | 9/2000 | O'Connor | A47C 7/383 | |
| | | | 297/397 | |
| 6,182,313 B1 * | 2/2001 | Eschenbach | A47G 9/10 | |
| | | | 5/637 | |
| 6,299,248 B1 * | 10/2001 | Gennaro | A47C 7/425 | |
| | | | 297/397 X | |
| 6,305,749 B1 * | 10/2001 | O'Connor | A47C 7/383 | |
| | | | 297/397 | |
| 6,648,416 B2 * | 11/2003 | O'Connor | A47C 7/383 | |
| | | | 297/397 | |
| 6,668,407 B1 * | 12/2003 | Reitzel | A47C 1/14 | |
| | | | 5/656 X | |
| 8,144,913 B1 * | 3/2012 | Myles, Jr. | H04R 5/023 | |
| | | | 381/374 | |
| 8,307,476 B1 * | 11/2012 | Weaver | A47G 9/062 | |
| | | | 5/656 X | |
| 9,338,536 B2 * | 5/2016 | Barksdale | H04R 3/12 | |
| 10,045,103 B1 * | 8/2018 | Mason | H04R 5/02 | |
| 10,562,426 B2 * | 2/2020 | Scott | B60N 2/868 | |
| 10,717,378 B2 * | 7/2020 | Durkee | B60N 2/0244 | |
| 10,730,423 B2 * | 8/2020 | Subat | B60N 2/01 | |
| 2002/0163240 A1 * | 11/2002 | Cheng | A47C 7/383 | |
| | | | 297/397 | |
| 2006/0250015 A1 * | 11/2006 | Buck | B60N 2/882 | |
| | | | 297/397 | |
| 2008/0256714 A1 * | 10/2008 | Cubbage | A45C 9/00 | |
| | | | 5/656 | |
| 2010/0148550 A1 * | 6/2010 | Kidd | B60N 2/818 | |
| | | | 297/217.4 | |
| 2010/0200001 A1 * | 8/2010 | Randall | A61F 5/56 | |
| | | | 128/845 | |
| 2013/0117939 A1 * | 5/2013 | Moss | A47G 9/1027 | |
| | | | 5/644 | |
| 2014/0130261 A1 * | 5/2014 | Gumbrecht | A47C 7/383 | |
| | | | 5/644 | |
| 2016/0068086 A1 * | 3/2016 | Gazit | B60N 2/4805 | |
| | | | 297/397 X | |
| 2016/0101716 A1 * | 4/2016 | Brecht | B61D 33/005 | |
| | | | 297/397 | |
| 2016/0114708 A1 * | 4/2016 | Spalter | A47C 7/383 | |
| | | | 297/397 | |
| 2018/0146807 A1 * | 5/2018 | Silver | A47G 9/1009 | |

* cited by examiner

ERGONOMIC HEADREST SPEAKER

CROSS-REFERENCE TO RELATED APPLICATION

This application claims the benefit of U.S. Provisional patent Application Ser. No. 62/821,395, filed Mar. 20, 2019 and Provisional patent Application Ser. No. 62/711,645, filed Jul. 30, 2019, which are incorporated herein in their entirety.

FIELD OF THE INVENTION

The present disclosure is directed to head rests, and more particularly to a head rest having audio playback capability and water resistance.

BACKGROUND OF THE INVENTION

It is common for people to use headrests. Examples of headrests may be pillows or cushions or other devices depending on usage situations. For example, a user may use a pillow to add cushioning or padding to their seat or bed arrangement. As another example, people commonly use pillows to support their heads and necks while traveling.

Conventional pillows work well for sleeping in a bed, or for use on a sofa, because they are soft and fluffy without specific focus on ergonomics. However, these pillows are not suitable for traveling, such as for use in airplanes, buses, or cars.

Therefore, there have been pillows and headrests developed for specific ergonomic requirements, such as airplane travel, where the pillow is commonly formed as a U-shape and are firmer than conventional pillows found on beds and sofas.

Further, it is common for individuals to enjoy listening to audio (e.g. music, podcasts, and audiobooks). For example, individuals may enjoy listening to audio while driving, while on an airplane, or while sitting on a bus, or at the beach. For such situations, users may use headphones, their smart phone, audio speakers in their vehicle, or portable speakers.

Furthermore, individuals enjoy being around wet or sandy environments such as the beach, where individuals enjoy swimming, sunbathing, or surfing.

However, if a user wanted to listen to audio while using currently available headrests, the user would need to buy and use a separate device such as a portable speaker or headphones. Further, currently available headrests are not water proof for use at the beach or pool.

Therefore, there exists a need for a headrest that allows users to listen to audio while being durable and waterproof enough to be used at the beach or pool.

SUMMARY OF THE INVENTION

This summary is provided to introduce a selection of concepts in a simplified form that are further described below in the detailed description. This summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

The herein disclosed invention is directed to a headrest speaker comprising a headrest body including one or more speakers and one or more ergonomic curves for supporting a user's head or neck.

In another aspect, the ergonomic curves may be configured for providing comfortable support for the user's head or neck.

In another aspect, the headrest body may have sides, a front, a back, and an upper surface and lower surface.

In another aspect, the headrest body may include one or more water resistant materials or one or more sand resistant materials.

In another aspect, materials for the body may be water-resistant foam.

In another aspect, components of the headrest speaker such as the speaker, or other internal electronic components, may be protected from water and sand by minimizing gaps in an outer housing, thus allowing the device to be used in sandy or wet environments.

In another aspect, the one or more speakers may be slightly angled upward toward ears of a user to provide maximum audio enjoyment to the user.

In another aspect, the headrest speaker is configured to be used in wet or sandy environments such as by the poolside, beach, or boating, and allows a user to lay down or sit back in a chair with their head and neck comfortably supported in the headrest speaker while listening to audio sourced from a compatible Bluetooth device such as a smart phone or tablet.

In another aspect, the headrest speaker further comprises a control panel. The control panel may include a power button, volume control, and charger input.

In another aspect, a USB port may also be included.

In another aspect, the control panel may also include an audio out port.

In another aspect, one or more of the components of the control panel may be shielded from potentially damaging elements (e.g. water and sand) by a protective cover, while still being accessible by a user.

In another aspect, the protective cover may be hinged, and selectively be opened and closed by a user.

In another aspect, in a closed state, the protective cover may protect the covered elements of the control panel from being damaged by sand, water, or even physical damage.

In another aspect, the headrest speaker may further include hook and loop fastener straps configured and positioned to allow attachment of the headrest speaker to a support surface such as a lounge chair.

In another aspect, the straps may include hook and loop fasteners such that two ends of the straps attach to one another easily.

In another aspect, other attachment mechanisms may be included, such as buttons, pins, and/or snap-locks.

In another aspect, the headrest speaker may be configured to wirelessly connect to an audio player such as a smart phone, and may be able to connect to multiple headrests at once via Bluetooth technology.

In another aspect, the headrest speaker may include raised vertical wings placed or disposed on opposite sides of the headrest body such that a user's head fits between the raised wings.

In another aspect, a user's head may fit between the raised wings, and one or both of the raised wings may encase the one or more speakers.

In another aspect, the wings may be angled slightly outward, such that a distance between the wings increases in an upward direction (e.g. perpendicular to the upper surface).

In another aspect, the control panel is positioned at a back (rear) of the headrest speaker.

In another aspect, the headrest speaker is configured to be wirelessly linked with one or more other headrest speakers (e.g. of the same kind) to share a listening experience among a plurality of headrest speakers.

In another aspect, an upper surface of the headrest speaker includes a concave curve and a convex curve and an inflection line (or inflection zone) between the concave curve and the convex curve, where the inflection line is oriented horizontally (e.g. from one side with a wing to an opposite side with a wing).

In another aspect, the curves may be concave or convex when viewed as a cross section, and an inflection point may be a zone or line along where the curves change from concave to convex or vice-versa.

In another aspect, the curves may be seen from one or both of a front-to-back cross section or side-to-side cross section.

In another aspect, the curves may be one, two, or three dimensional (e.g. the curve may be an arc of an imaginary circle or sphere, or other three dimensional shape).

In another aspect, a convex curve for the neck portion of the user may have a convex curve when viewed from the side, but concave when viewed from the front.

In another aspect, the concave curve spans a greater distance on an upper surface than the convex curve, providing more space for the head to rest on the concave curve and the neck to be supported by the convex curve.

In another aspect, the neck support area has less surface area of support than the head support area of the headrest speaker.

In another aspect, the concave curve has a larger radius than the convex curve, allowing the head to be comfortably supported since the head may require a larger radius curvature than the neck.

In another aspect, the concave surface may have a three dimensional curve profile (e.g. curves in more than one dimension) for supporting the head, and the convex curve may have only a one dimensional curve profile to support the neck.

In another aspect, the concave and convex curves may be curved from front to back and/or side to side.

In another aspect, the concave and convex curves may have a curvature only from front to back of the curve.

In another aspect, the inflection point itself may have a curvature in a perpendicular direction with respect to the tangent between the concave and convex curves.

In another aspect, the inflection point is seen from a front-to-back cross section, but from a side-to side cross section the inflection line may or may not be curved.

In another aspect, the inflection line would not curve if viewed from a side-to-side cross sectional plane, but that a side-to-side cross section of the inflection line may show a curve along the inflection line (e.g. a concave or convex curve for ergonomics with the neck)

In another aspect, the wings extend substantially along a side of the concave curve, and extend minimally along sides of the convex curve, or such that the wings do not extend at all along the sides of the convex curve, to ensure that the user's head is supported between the speakers, and to give structure for installing the speakers in an elevated fashion with respect to the upper surface, without requiring extra material at the neck support area (front).

In another aspect, the speakers may be located on another portion of the headrest speaker, such as the upper surface.

In another aspect, edges of the device may be rounded or curved to be ergonomically comfortable to a user, and to minimize sharp edges.

In another aspect, the speakers may be angled upwardly toward a user's ears, and the angle may be 30 degrees.

These and other objects, features, and advantages of the present invention will become more readily apparent from the attached drawings and the detailed description of the preferred embodiments, which follow.

BRIEF DESCRIPTION OF THE DRAWINGS

The preferred embodiments of the invention will hereinafter be described in conjunction with the appended drawings provided to illustrate and not to limit the invention, where like designations denote like elements, and in which.

Like reference numerals refer to like parts throughout the several views of the drawings.

DETAILED DESCRIPTION

Figure 1:
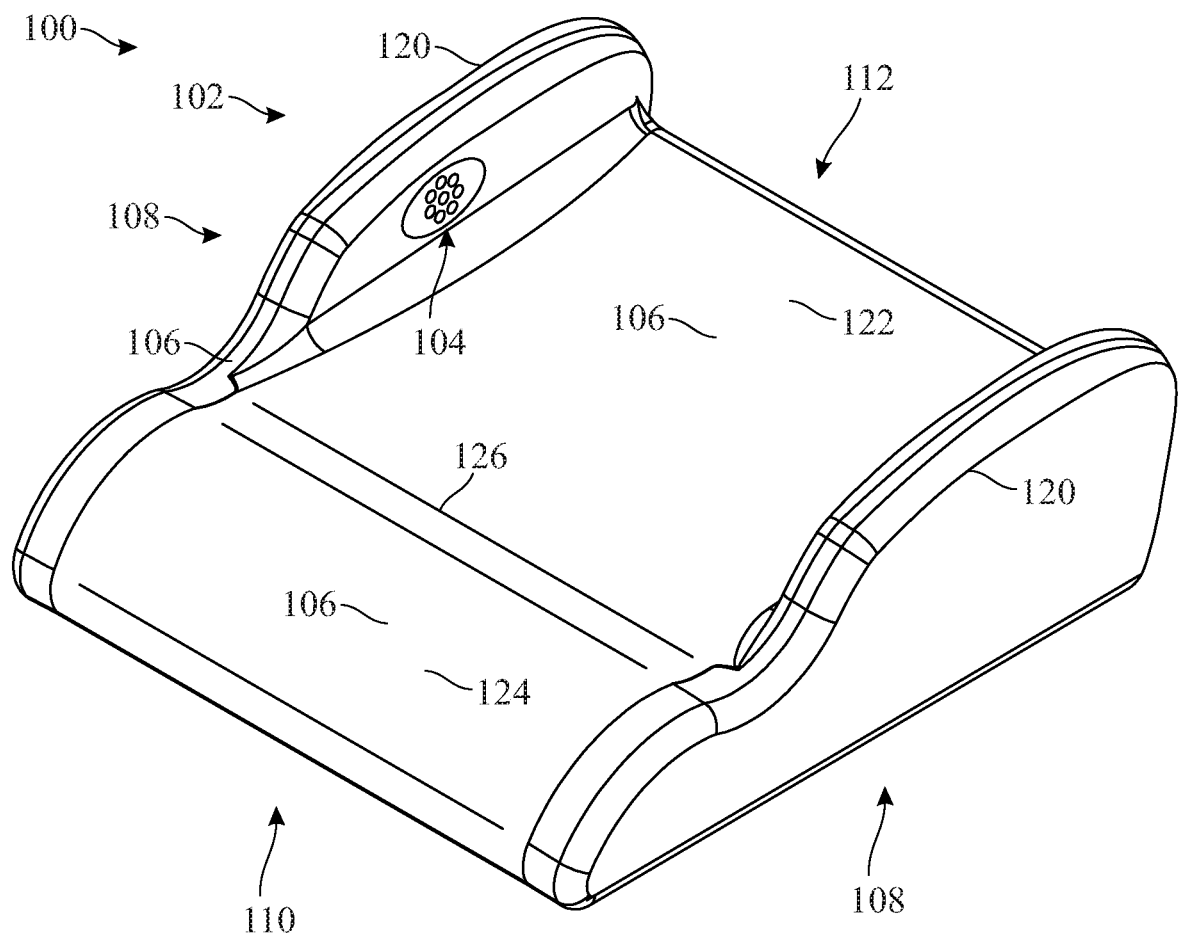
FIG. 1 presents a back-top isometric view of a headrest speaker, where the headrest speaker includes a headrest body including one or more speakers and one or more ergonomic curves for supporting a user's head or neck, in accordance with aspects of the present disclosure.

The following detailed description is merely exemplary in nature and is not intended to limit the described embodiments or the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to make or use the embodiments of the disclosure and are not intended to limit the scope of the disclosure, which is defined by the claims. For purposes of description herein, the terms "upper", "lower", "left", "rear", "right", "front", "vertical", "horizontal", and derivatives thereof shall relate to the invention as oriented in FIG. 1. Furthermore, there is no intention to be bound by any expressed or implied theory presented in the preceding technical field, background, brief summary or the following detailed description. It is also to be understood that the specific devices and processes illustrated in the attached drawings, and described in the following specification, are simply exemplary embodiments of the inventive concepts defined in the appended claims. Hence, specific dimensions and other physical characteristics relating to the embodiments disclosed herein are not to be considered as limiting, unless the claims expressly state otherwise.

It is to be understood that the descriptions herein and elements shown in the drawings are non-limiting, and are shown as examples.

As shown throughout the figures, the present disclosure is directed to a headrest speaker 100. The headrest speaker 100 may comprise a headrest body 102 including one or more speakers 104 and one or more ergonomic curves 106 for supporting a user's head 602 or neck 604. The ergonomic curves 106 may be configured for providing comfortable support for the user's head 602 or neck 604. The headrest body 102 may have sides 108, a front 110, a back 112, and an upper surface 114 and lower surface 116.

The headrest body 102 may include one or more water resistant materials or one or more sand resistant materials. Appropriate materials for the body may be water-resistant foam. Components of the headrest speaker 100 such as the speaker, or other internal electronic components, may be protected from water and sand by minimizing gaps in an outer housing, thus allowing the device to be used in sandy or wet environments. The one or more speakers 104 may be slightly angled toward ears of a user to provide maximum audio enjoyment to the user.

For example, the headrest speaker 100 is configured to be used in wet or sandy environments such as by the poolside, beach, or boating, and allows a user to lay down or sit back in a chair with their head 602 and neck 604 comfortably supported in the headrest speaker 100 while listening to their favorite audio sourced from a compatible Bluetooth device such as a smart phone or tablet.

Figure 4:
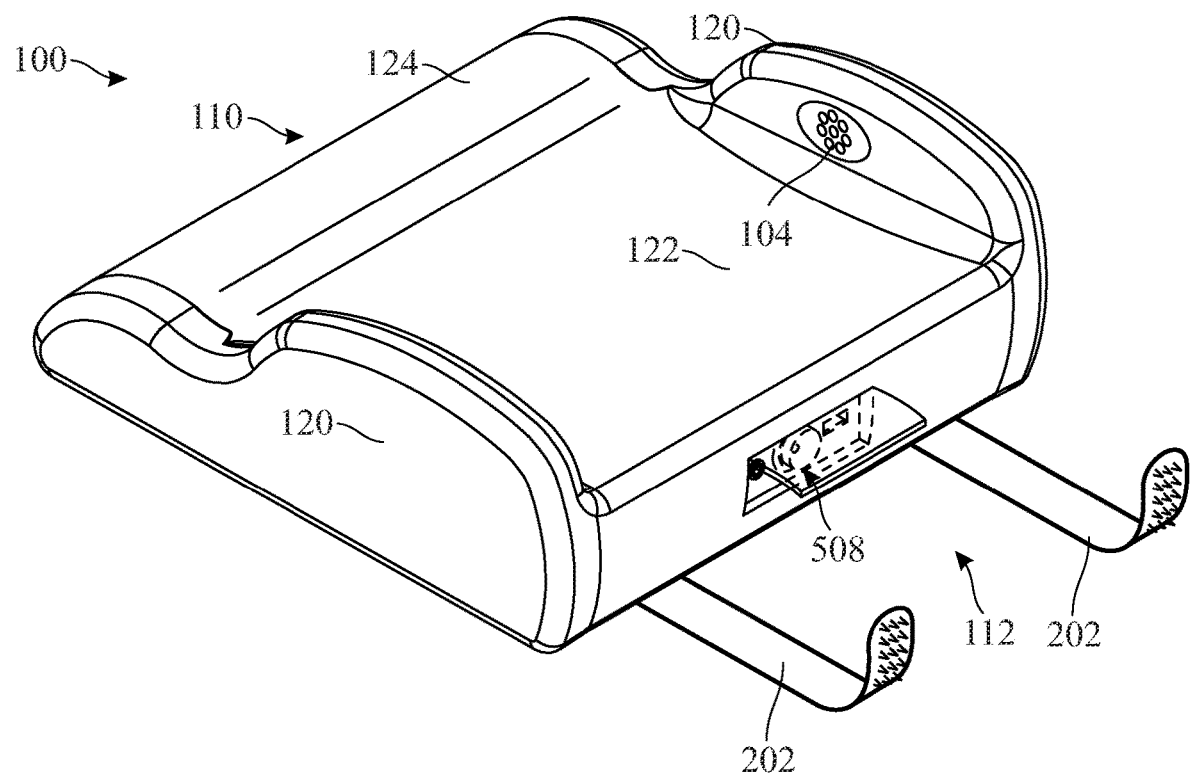
FIG. 4 presents a front-top isometric view of the headrest speaker, where the straps are shown open, and a control panel cover is opened for allowing access to the control panel, the control panel including a volume knob, a power port, and a USB port, in accordance with aspects of the present disclosure.
Figure 5:
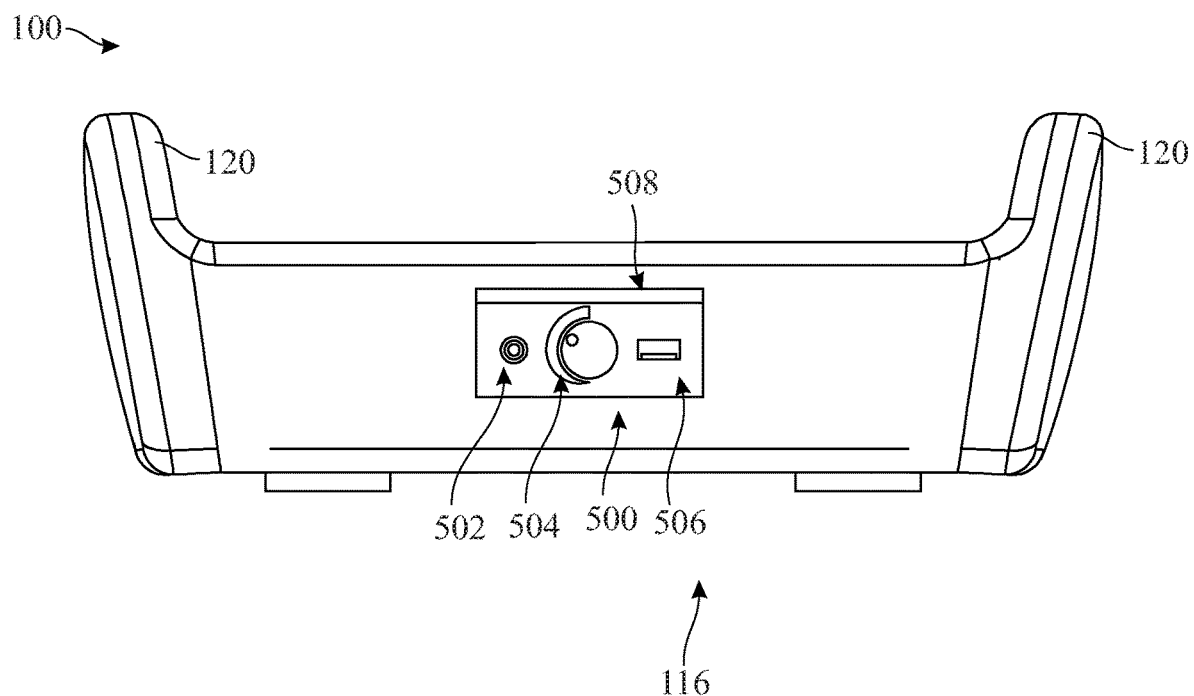
FIG. 5 presents a front elevation view of the headrest speaker, where various features of the control panel are shown, in accordance with aspects of the present disclosure.

In one example, the headrest speaker 100 further comprises a control panel 500. The control panel may include a power button 502, volume control 504, and charger input 506. A USB port may also be included as shown in FIG. 5. The control panel may also include an audio out port. One or more of the components of the control panel 500 may be shielded from potentially damaging elements (e.g. water and sand) by a protective cover 508, while still being accessible by a user. For example, as shown in FIG. 4, the protective cover 508 may be hinged, and selectively be opened and closed by a user. In a closed state, the protective cover may protect the covered elements of the control panel 500 from being damaged by sand, water, or even physical damage.

Figure 2:
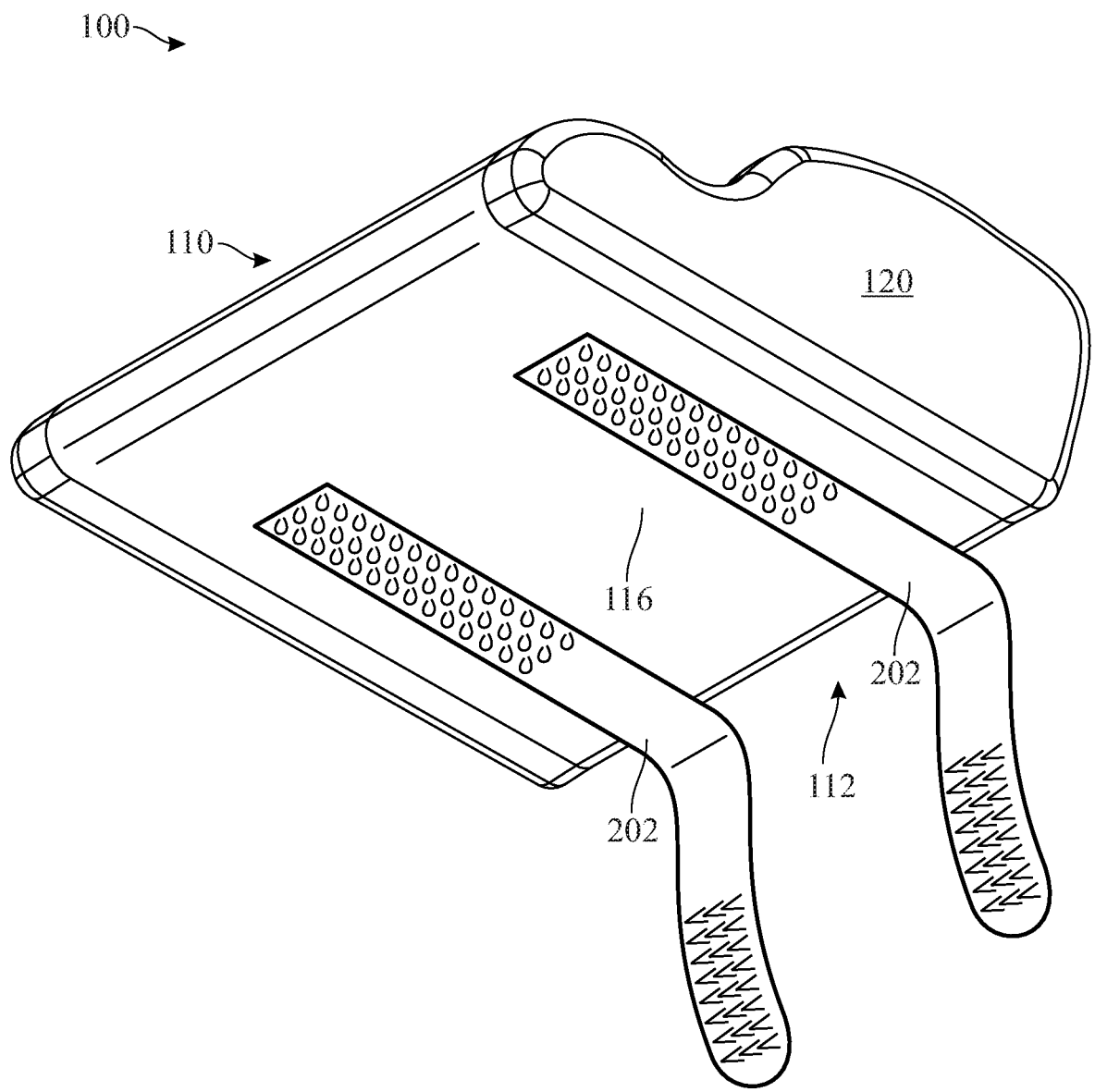
FIG. 2 presents a bottom isometric view of the headrest speaker, where straps are shown open, in accordance with aspects of the present disclosure.
Figure 3:
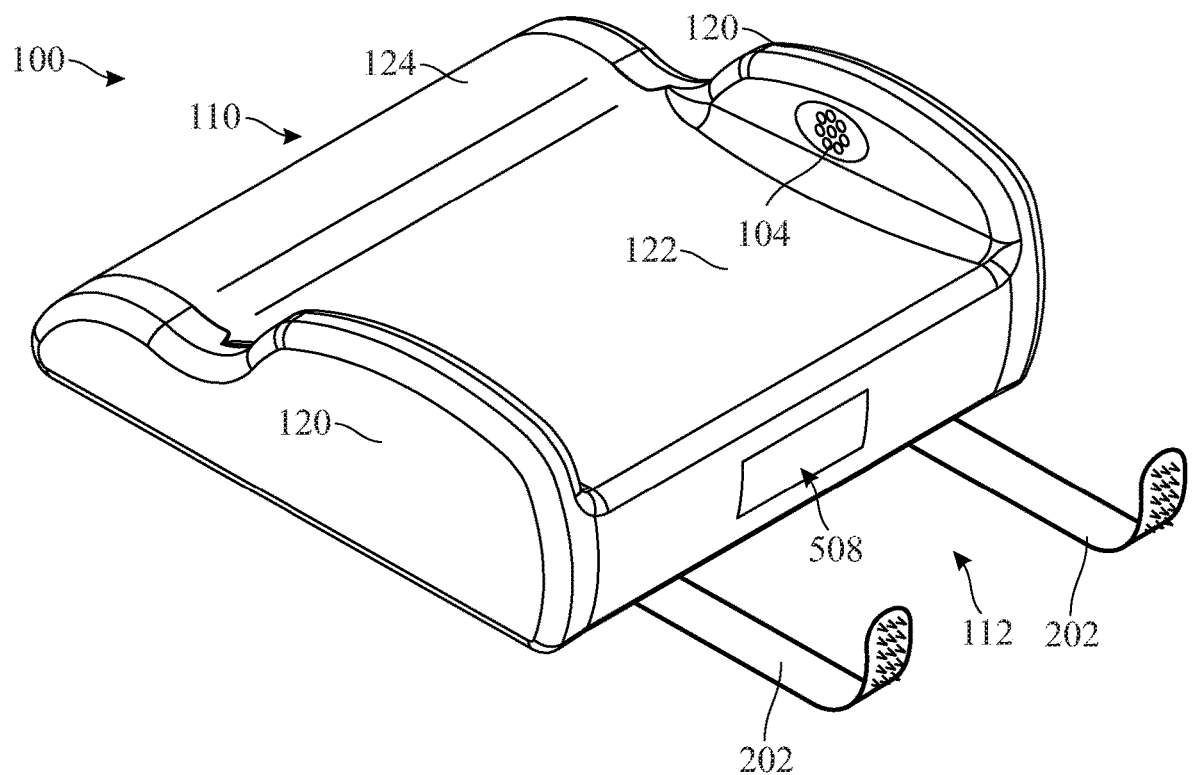
FIG. 3 presents a front-top isometric view of the headrest speaker, where straps are shown open, in accordance with aspects of the present disclosure.

As shown in FIG. 2, the headrest speaker 100 may further include hook and loop fastener straps 202 configured and positioned to allow attachment of the headrest speaker 100 to a support surface such as a lounge chair. This allows a user to enjoy a comfortable audio-playing headrest at the beach, as a non-limiting example. The straps may include hook and loop fasteners such that two ends of the straps attach to one another easily. Other attachment mechanisms may be included, such as buttons, pins, and/or snap-locks.

The headrest speaker 100 may be configured to wirelessly connect to an audio player such as a smart phone, and may be able to connect to multiple devices at once via Bluetooth technology.

As shown throughout the figures, for example in FIG. 1, the headrest speaker 100 may include raised wings 120 placed or disposed on opposite sides 108 of the headrest body 102 such that a user's head 602 fits between the raised wings. For example a user's head 602 may fit between the raised wings 120 (FIG. 6), and one or both of the raised wings 120 may encase the one or more speakers 104. As an example, the wings 120 may be angled slightly outward, such that a distance between the wings increases in an upward direction (FIG. 5, e.g. the direction perpendicular to the upper surface 114). An upward direction may be an upward direction from the perspective of FIGS. 5 and 6 for example.

In one example, the control panel 500 is positioned at a back 112 (rear) of the headrest speaker 100. But, it is to be understood that the control panel 500 may be positioned at any location on the headrest speaker 100.

In another example, the headrest speaker 100 is configured to be wirelessly linked with one or more other headrest speakers 104 (e.g. of the same kind) to share a listening experience among a plurality of headrest speakers 104.

An upper surface 114 of the headrest speaker includes a concave curve 122 and a convex curve 124 and an inflection line 126 (or inflection zone) between the concave curve 122 and the convex curve 124, where the inflection line 126 is oriented horizontally (e.g. from one side 108 with a wing 120 to an opposite side 108 with a wing 120). For example, in other words, the curves 106 may be concave or convex when viewed as a cross section (FIG. 6, dashed line), and an inflection point 126 may be a zone or line along where the curves 106 change from concave to convex or vice-versa. The curves 106 may be seen from one or both of a front-to-back cross section (partially shown in FIG. 6) or side-to-side cross section, as a non-limiting example. The curves 106 may be one, two, or three dimensional (e.g. a curve 106 may be an arc of an imaginary circle or sphere, or other three dimensional shape). As a non-limiting example, a convex curve for the neck portion of the user may have a convex curve when viewed from the side, but concave when viewed from the front.

As one example, the concave curve 122 spans a greater distance on an upper surface 114 than the convex curve 124. This provides more space for the head to rest on the concave curve 122 and the neck to be supported by the convex curve 124. The neck may require less surface area of support than the head, for instance.

In another example, the concave curve 122 has a larger radius than the convex curve 124. This allows the head 602 to be comfortably supported since the head 602 may require a larger radius curvature than the neck 604. In some examples, the concave surface 122 may have a three dimensional curve profile (e.g. curves in more than one dimension) for supporting the head 602, and the convex curve 124 may have only a one dimensional curve profile (e.g. the curve shown in FIG. 6) to support the neck 604.

In other words, the concave and convex curves may be curved from front to back and/or side to side. The concave and convex curves may have a curvature only from front to back of the curve.

Figure 6:
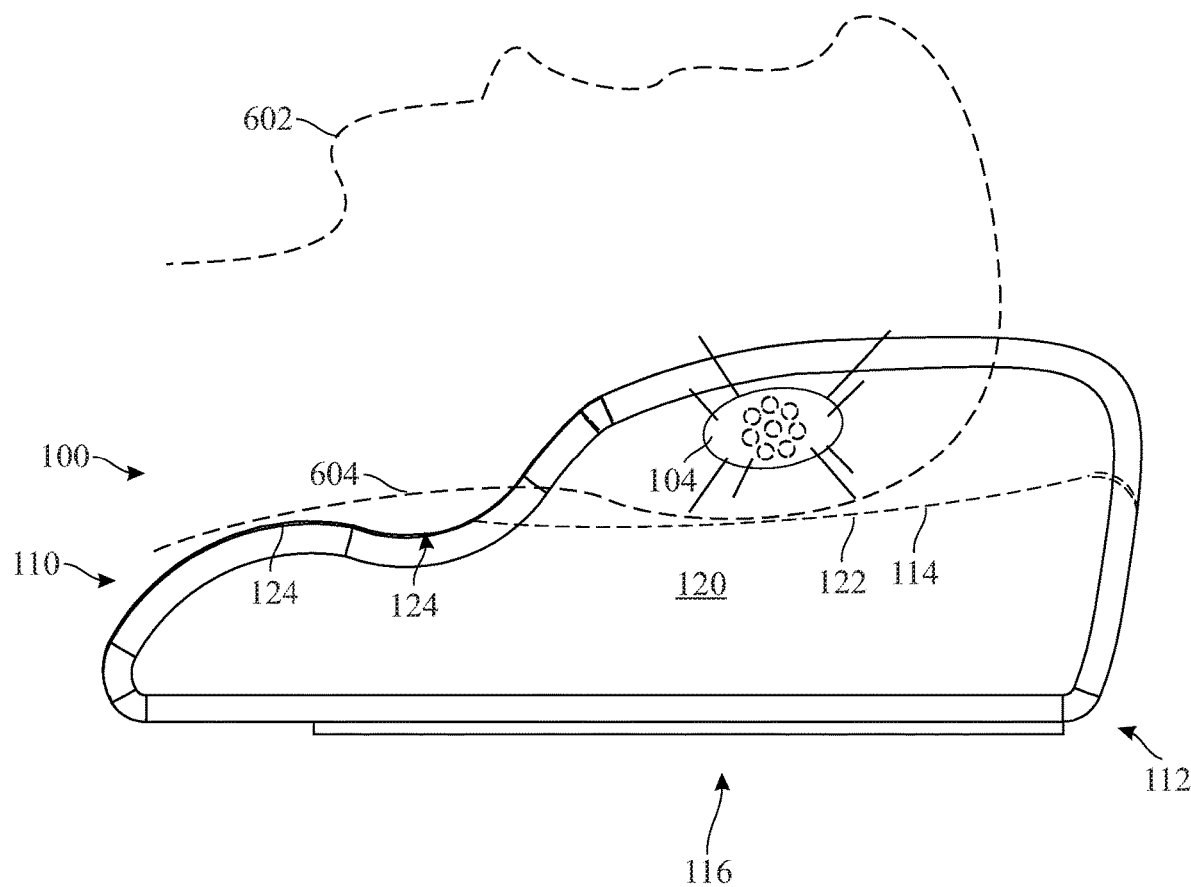
FIG. 6 presents a side elevation view of the headrest speaker, where speakers are shown playing audio and a silhouette of a user is shown resting their head on the headrest speaker, in accordance with aspects of the present disclosure.

In some examples, the inflection point itself may have a curvature in a perpendicular direction with respect to the tangent between the concave and convex curves. For example, the inflection point 126 shown in FIG. 6 is seen from a front-to-back cross section, but from a side-to side cross section the inflection line may or may not be curved. For example, FIG. 1 shows that the inflection line 126 would not curve if viewed from a side-to-side cross sectional plane, but it is to be understood that a side-to-side cross section of the inflection line may show a curve along the inflection line (e.g. a concave or convex curve for ergonomics with the neck 604), in some embodiments.

In another example, the wings 120 extend substantially along a side of the concave curve 122, and extend minimally along sides of the convex curve 124, or such that the wings do not extend at all along the sides of the convex curve 124. The purpose of this configuration is to ensure that the user's head is supported between the speakers, and to give structure for installing the speakers in an elevated fashion with respect to the upper surface, without requiring extra material at the neck support area (front). In some examples, the speakers may be located on another other portion of the headrest speaker 100, such as the upper surface 114.

It is to be understood that edges of the device may be rounded or curved to be ergonomically comfortable to a user, and to minimize sharp edges. The speakers may be angled upwardly toward a user's ears, and the angle may be 30 degrees, for example.

It is to be understood that the term "curve" is defined as a profile that has a gradually changing slope, either convex or concave. The gradually changing slope may change in any direction, such as in one, two, or three dimensions. And inflection point, line, or area is a point, line, or area that changes from a concave slope to a convex slope, and vice-versa.

Since many modifications, variations, and changes in detail can be made to the described preferred embodiments of the invention, it is intended that all matters in the foregoing description and shown in the accompanying drawings be interpreted as illustrative and not in a limiting sense. Thus, the scope of the invention should be determined by the appended claims and their legal equivalents.

What is claimed is:

1. A portable ergonomic headrest system, the portable ergonomic headrest system comprising one or more portable headrests, the one or more portable headrests comprising:
    a headrest body including one or more speakers, the one or more speakers of the portable headrest being configured to wirelessly connect to an audio source; and the one or more speakers of the other portable headrests of the one or more portable headrests configured to wirelessly connect to the audio source such that a plurality of portable headrests may share the same listening experience; and
    left and right sides, a front, a back, an upper surface and a lower surface; wherein
    the upper surface includes one or more ergonomic convex and concave curves for supporting a user's head or neck.

2. The portable ergonomic headrest system of claim 1, wherein the ergonomic curves of the one or more portable headrests are configured for providing a comfortable support for the user's head or neck.

3. The portable ergonomic headrest system of claim 1, wherein the one or more speakers of the one or more portable headrests are slightly angled upward toward ears of a user to provide maximum audio enjoyment to the user while the user lays their head on the headrest body.

4. The portable ergonomic headrest system of claim 1, wherein the the one or more portable headrests further comprise a control panel that is shielded from water or sand by a protective cover, while still being accessible by a user to operate various functions of the headrest speaker.

5. The portable ergonomic headrest system of claim 1, wherein the one or more portable headrests further include hook and loop fastener straps configured and positioned to allow attachment of the headrest speaker to a support surface.

6. The portable ergonomic headrest system of claim 1, wherein the the one or more portable headrests include raised vertical wings placed or disposed on opposite sides of the headrest body such that a user's head fits between the raised wings.

7. The portable ergonomic headrest system of claim 1,
    wherein the the one or more portable headrests include raised vertical wings placed or disposed on opposite sides of the headrest body such that a user's head fits between the raised wings;
    wherein a user's head fits between the raised wings, and one or both of the raised wings encase the one or more speakers.

8. The portable ergonomic headrest system of claim 1,
    wherein the the one or more portable headrests include raised vertical wings placed or disposed on opposite sides of the headrest body such that a user's head fits between the raised wings;
    wherein the wings are angled slightly outward, such that a distance between the wings increases in an upward direction, the upward direction generally perpendicular to the upper surface.

9. The portable ergonomic headrest system of claim 1, wherein an upper surface of the one or more portable headrests include a concave curve and a convex curve and an inflection line or inflection zone between the concave curve and the convex curve, where the inflection line or zone is oriented horizontally from one side with a wing to an opposite side with a wing.

10. The portable ergonomic headrest system of claim 1, wherein a convex curve for the neck portion of the user has a convex curve when viewed from the side, but concave when viewed from the front.

11. The portable ergonomic headrest system of claim 1, wherein a concave curve spans a greater distance on an upper surface than a convex curve, providing more space for the head to rest on the concave curve and the neck to be supported by the convex curve.

12. The portable ergonomic headrest system of claim 1, wherein a concave curve has a larger radius than a convex curve, allowing the head to be comfortably supported since the head typically requires a larger radius curvature than the neck.

13. The portable ergonomic headrest system of claim 1, wherein a concave surface has a three dimensional curve profile such that it curves in more than one dimension for supporting the head, and a convex curve has only a one dimensional curve profile to support the neck.

14. A portable ergonomic headrest system, the portable ergonomic headrest system comprising one or more portable headrests, the one or more portable headrests comprising:
    a headrest body including one or more speakers, the one or more speakers of the portable headrest being configured to wirelessly connect to an audio source; and the one or more speakers of the other portable headrests of the one or more portable headrests configured to wirelessly connect to the audio source such that a plurality of portable headrests may share the same listening experience; and
    left and right sides, a front, a back, an upper surface and a lower surface; wherein
    the upper surface includes one or more ergonomic convex and concave curves for supporting a user's head or neck; and further wherein the one or more portable headrests each include raised vertical wings placed or disposed on opposite sides of the headrest body such that a user's head fits between the raised wings.

15. A portable ergonomic headrest system, the portable ergonomic headrest system comprising one or more portable headrests, the one or more portable headrests comprising:
- a headrest body including one or more speakers, the one or more speakers of the portable headrest being configured to wirelessly connect to an audio source; and the one or more speakers of the other portable headrests of the one or more portable headrests configured to wirelessly connect to the audio source such that a plurality of portable headrests may share the same listening experience;
- a USB and an audio out port; and
- left and right siders, a front, a back, an upper surface and a lower surface; wherein
the upper surface includes one or more ergonomic convex and concave curves for supporting the user's head or neck.

16. The portable ergonomic headrest system of claim 15, wherein the the one or more portable headrests each include raised vertical wings placed or disposed on opposite sides of the headrest body such that a user's head fits between the raised wings.

17. The portable ergonomic headrest system of claim 15,
- wherein the the one or more portable headrests each include raised vertical wings placed or disposed on opposite sides of the headrest body such that a user's head fits between the raised wings;
- wherein a user's head fits between the raised wings, and one or both of the raised wings encase the one or more speakers.

* * * * *